(12) United States Patent  
Matlack et al.

(10) Patent No.: US 9,022,376 B2
(45) Date of Patent: May 5, 2015

(54) RECONFIGURABLE CLAMPING SYSTEM

(71) Applicant: The Boeing Company, Chicago, IL (US)

(72) Inventors: Mike P. Matlack, St. Charles, MO (US); Kurt A. Burton, Wildwood, MO (US); John A. Baumann, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 13/932,897

(22) Filed: Jul. 1, 2013

(65) Prior Publication Data

US 2013/0292891 A1    Nov. 7, 2013

Related U.S. Application Data

(62) Division of application No. 11/764,304, filed on Jun. 18, 2007, now Pat. No. 8,499,433.

(60) Provisional application No. 60/849,688, filed on Oct. 5, 2006.

(51) Int. Cl.
*B25B 1/24* (2006.01)
*B25B 1/04* (2006.01)
(Continued)

(52) U.S. Cl.
CPC ............... *B23Q 3/062* (2013.01); *B23Q 3/069* (2013.01)

(58) Field of Classification Search
CPC .......... B23Q 3/062; B23Q 3/069; B25B 5/14; B25B 5/003; B25B 11/02; B25B 1/205; B25B 1/14; B25B 1/241; B23P 19/04; B21C 37/121; B23K 37/0533; B23K 37/0443

USPC ................. 29/559, 429; 269/43, 45, 130, 126
See application file for complete search history.

(56) References Cited

U.S. PATENT DOCUMENTS 2,324,803 A  *  7/1943  Snyder ............................ 269/75
2,733,526 A  *  2/1956  Blay .............................. 40/331
(Continued)

FOREIGN PATENT DOCUMENTS

GB         2169836          7/1986
GB         2169836  A  *   7/1986

OTHER PUBLICATIONS

United States Patent and Trademark Office, "Requirement for Restriction/Election," issued in connection with U.S. Appl. No. 11/764,304, Dec. 22, 2010, 7 pages.

(Continued)

*Primary Examiner* — Jermie Cozart
*Assistant Examiner* — Bayan Salone
(74) *Attorney, Agent, or Firm* — Hanley, Flight & Zimmerman, LLC

(57) ABSTRACT

A reconfigurable clamping system is disclosed. An example clamping system for securing a workpiece comprises a retention assembly and an inflatable bladder. The retention assembly comprises a plurality of links, each pair of adjacent links having a pivotal connection to enable the retention assembly to be configured to the general shape of a workpiece, and each pair of adjacent links having a locking mechanism to selectively lock an angular relationship between the pair. The inflatable bladder is coupled between the retention assembly and the workpiece and is to apply a clamping force to the workpiece.

13 Claims, 6 Drawing Sheets

(51) Int. Cl.
*B25B 1/20* (2006.01)
*B25B 5/16* (2006.01)
*B23P 11/00* (2006.01)
*B23Q 7/00* (2006.01)
*B23Q 3/06* (2006.01)

(56) References Cited

U.S. PATENT DOCUMENTS

| | | | | |
|---|---|---|---|---|
| 3,207,503 | A | * | 9/1965 | Clover, Jr. et al. .............. 269/21 |
| 3,616,075 | A | * | 10/1971 | Jarvis et al. .................... 156/479 |
| 3,944,202 | A | * | 3/1976 | Dearman ...................... 269/130 |
| 4,011,979 | A | * | 3/1977 | Hagen et al. ................. 228/49.3 |
| 4,133,106 | A | * | 1/1979 | Addis ............................. 30/160 |
| 4,135,694 | A | * | 1/1979 | Stegenga et al. .............. 248/478 |
| 4,356,615 | A | * | 11/1982 | Dearman ........................ 29/525 |
| 4,492,015 | A | * | 1/1985 | Dearman ...................... 29/281.5 |
| 4,527,783 | A | * | 7/1985 | Collora et al. .................. 269/21 |
| 4,726,575 | A | * | 2/1988 | Dearman ........................ 269/43 |
| 4,815,719 | A | * | 3/1989 | Peters et al. ................... 269/130 |
| 5,026,033 | A | * | 6/1991 | Roxy ............................... 269/45 |
| 5,249,785 | A | * | 10/1993 | Nelson et al. ................... 269/21 |
| 5,364,083 | A | * | 11/1994 | Ross et al. ...................... 269/21 |
| 5,643,522 | A | * | 7/1997 | Park ............................... 264/313 |
| 5,657,972 | A | * | 8/1997 | Blatt .............................. 269/22 |
| 5,890,417 | A | * | 4/1999 | Kim ............................... 92/190 |
| 6,641,124 | B2 | * | 11/2003 | Melanson ....................... 269/43 |
| 6,662,083 | B2 | * | 12/2003 | Angel ........................... 700/248 |
| 7,464,853 | B2 | * | 12/2008 | Buchheit et al. ........... 228/112.1 |
| 8,499,433 | B2 | * | 8/2013 | Matlack et al. .................. 29/559 |
| 2004/0033711 | A1 | * | 2/2004 | Loveless et al. .............. 439/314 |
| 2005/0092817 | A1 | * | 5/2005 | Baumann et al. ............. 228/212 |
| 2005/0093219 | A1 | * | 5/2005 | Baumann ...................... 269/166 |
| 2006/0237888 | A1 | * | 10/2006 | Burton et al. ................... 269/22 |
| 2007/0246876 | A1 | * | 10/2007 | Wood et al. .................... 269/22 |
| 2008/0084012 | A1 | * | 4/2008 | Matlack et al. ................. 269/20 |

OTHER PUBLICATIONS

United States Patent and Trademark Office, "Non-Final Office Action", issued in connection with U.S. Appl. No. 11/764,304, Mar. 30, 2011, 21 pages.

United States Patent and Trademark Office, "Final Office Action," issued in connection with U.S. Appl. No. 11/764,304, Aug. 12, 2011, 18 pages.

United States Patent and Trademark Office, "Non-Final Office Action," issued in connection with U.S. Appl. No. 11/764,304, Jan. 5, 2012, 24 pages.

United States Patent and Trademark Office, "Final Office Action," issued in connection with U.S. Appl. No. 11/764,304, Jun. 22, 2012, 31 pages.

United States Patent and Trademark Office, "Non-Final Office Action," issued in connection with U.S. Appl. No. 11/764,304, Nov. 13, 2012, 16 pages.

United States Patent and Trademark Office, "Non-Final Office Action," issued in connection with U.S. Appl. No. 11/764,304, Mar. 29, 2013, 21 pages.

* cited by examiner

RECONFIGURABLE CLAMPING SYSTEM

CROSS REFERENCE TO RELATED APPLICATIONS

This patent arises from a continuation of U.S. patent application Ser. No. 11/764,304, filed Jun. 18, 2007, and claims the benefit of Provisional U.S. Patent Application Ser. No. 60/849,688, filed Oct. 5, 2006, the entireties of which are incorporated by reference herein.

TECHNICAL FIELD

This disclosure generally relates to systems for clamping workpieces, and deals more particularly with a clamping system that can be reconfigured to match the contours of workpieces having differing shapes.

BACKGROUND

Various types of known clamping systems may be used to hold workpieces during manufacturing operations such as machining, routing, cutting and welding. These systems may include combinations of toe-clamps, spring clamps, hold-down bars, constant mold-line bladder tools and set screws that are configured to clamp the workpiece to a base. For example, one such clamping system is disclosed in US Patent Application Publication No. US 2006/0237888 A1 owned by The Boeing Company in which an inflatable bladder is held against a workpiece by a rigid retaining bar fastened to a base. Inflation of the bladder applies a clamping force to the workpiece.

While clamping systems of the type described above provide satisfactory results, they may be limited in their use to workpieces having a particular configuration or surface contour. These clamping systems are often custom-made to match the configuration of the particular workpiece to be clamped, and thus may not be readily adaptable to clamp workpieces having other configurations.

Accordingly, there is a need for an adaptable clamping system that may be readily reconfigured for clamping workpieces having a variety of configurations, thereby avoiding the cost of fabricating clamping elements that are unique to a particular workpiece configuration. Illustrated embodiments of the disclosure are intended to satisfy this need.

SUMMARY

The disclosed embodiments provide a reconfigurable clamping system in which a flexible retention assembly can be reconfigured for use with any of multiple workpieces having differing feature configurations, or a single workpiece having varying surface contours. The retention assembly may be reconfigured easily and quickly without the need for special tools or clamping elements that are unique to a particular workpiece configuration.

According to one embodiment of the disclosure, a clamping system is provided for securing a workpiece comprising: a retention assembly that may be positioned over the workpiece, including a plurality of links; a pivotal connection between each of the links allowing the retention assembly to be configured to the general shape of the workpiece; and, an inflatable bladder positioned between the retention assembly and the workpiece for applying a clamping force to the workpiece. The links may be Z-shaped and arranged in overlapping, nested relationship with each other. A locking mechanism is provided for locking the configuration of the retention assembly to match the configuration of a particular workpiece. The locking mechanism may include spline gears on opposing faces of adjacent links, and fasteners which clench the gears together to lock the links in a desired configuration. A spring may be used between the links for biasing the opposing spline gears away from each other, to allow free rotation of the links during a reconfiguration process. A recess may be provided in the bottom of the links which forms a channel for holding the bladder assembly.

According to another disclosed embodiment, a reconfigurable clamping system is provided for securing a workpiece, comprising: a retention assembly reconfigurable to generally match the shape of differing workpieces; a locking device for locking the retention assembly in a desired configuration generally matching the shape of a workpiece; and, an inflatable bladder positioned between the retention assembly and the workpiece for applying a clamping force to the workpiece. The retention assembly may include a chain of pivotally connected links, and locking elements for locking the links against pivotal movement relative to each other. The locking device may include interlocking elements respectively on opposing faces of the links for locking the links against pivotal movement in order to fix the configuration of the retention assembly to match the configuration of a particular workpiece.

According to a method embodiment of the disclosure, clamping a workpiece during a manufacturing operation comprises the steps of: configuring a flexible retention assembly to generally match the shape of the workpiece; fixing the configuration of retention assembly to form a rigid retention assembly; bridging at least a portion of the workpiece with the rigid retention assembly; placing a bladder between the rigid retention assembly and the workpiece; and, inflating the bladder. The retention assembly is configured by placing a flexible chain of links over the workpiece to generally conform to the workpiece. The configuration of the retention assembly may be fixed by locking the position of the links relative to each other. The method may include reconfiguring the retention assembly to match the shape of multiple workpieces having differing contours or feature configurations.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
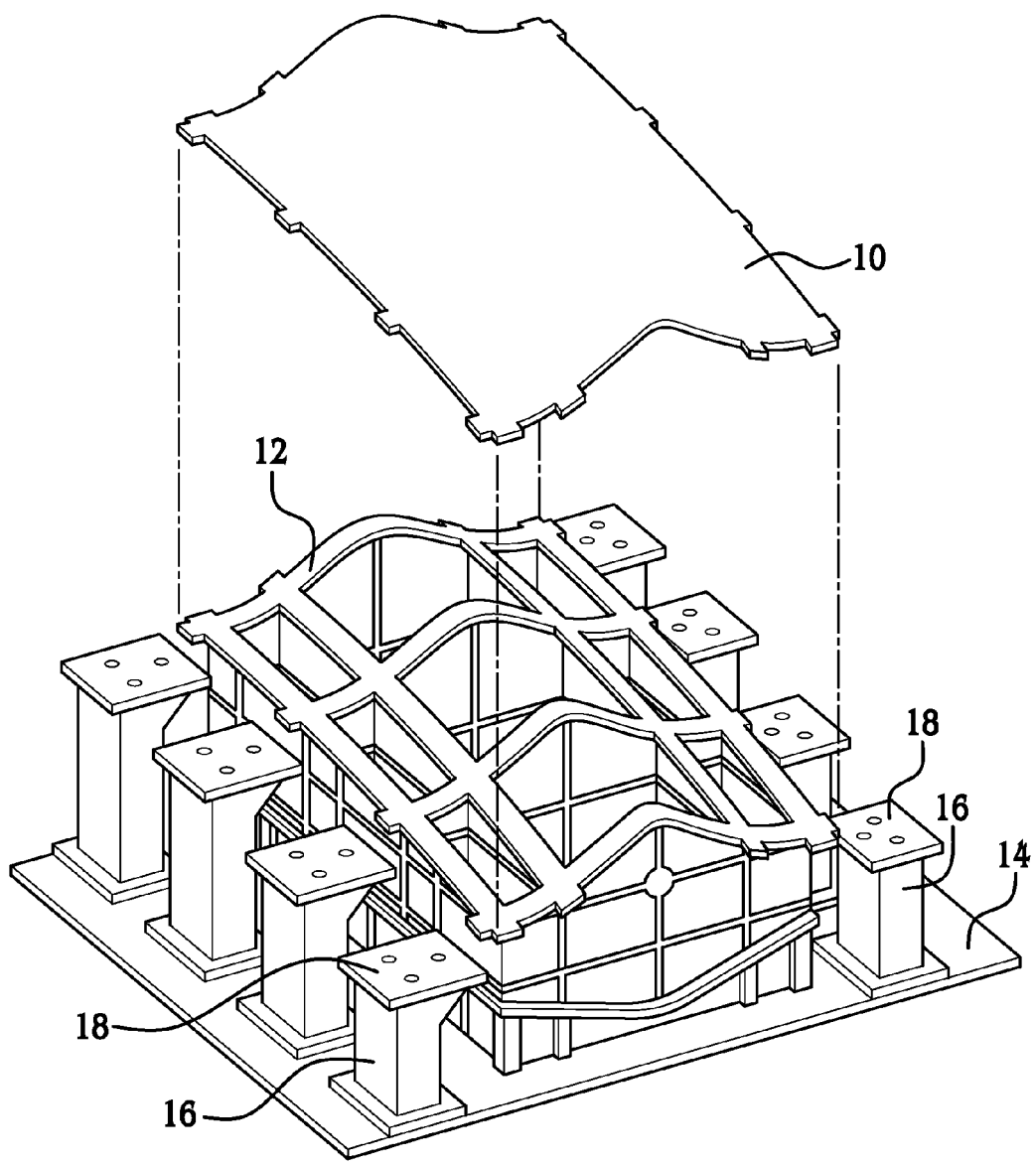
FIG. 1 is an exploded, isometric illustration of a workpiece and a substructure on which the workpiece is to be clamped.

Referring to FIGS. 1-7, the disclosed embodiments relate to a clamping system generally indicated at 20 for clamping a workpiece 10 on a substructure 12. As shown in FIG. 1A, the clamping assembly 20 broadly comprises a retention assembly 22 and an inflatable bladder 30 for applying a clamping force 17 the workpiece 10. The retention assembly 22 includes a plurality of links 22 coupled together by pivotal connections 19. The retention assembly 22 retains the inflatable bladder 30 in position over the workpiece 10. Inflation of the inflatable bladder 30 results in the application of the clamping force 17 to the workpiece 10. The substructure 12 applies a reactive force 21 to the workpiece 10, causing the workpiece 10 to be clamped between the substructure 12 and the clamping assembly 20.

In the illustrated embodiment, the workpiece 10 comprises a skin that is intended to be fastened, as by welding, to a substructure 12 that may form, for example, part of an aircraft. A series of spaced mounting post assemblies 16 are positioned on opposite sides of the substructure 12 and each include a mounting plate 18. The mounting plates 18 have a common hole pattern allowing any of identical clamping assemblies 20 to be secured to the mounting post assemblies 16 using mounting blocks 23 and hold down fasteners 24. An adjustment screw such as a set screw 25 may be used to adjust the attitude of the mounting blocks 23 on the plates 18. Mounting post assemblies 16 along with the substructure 12 are supported on a common base 14.

Figure 1A:
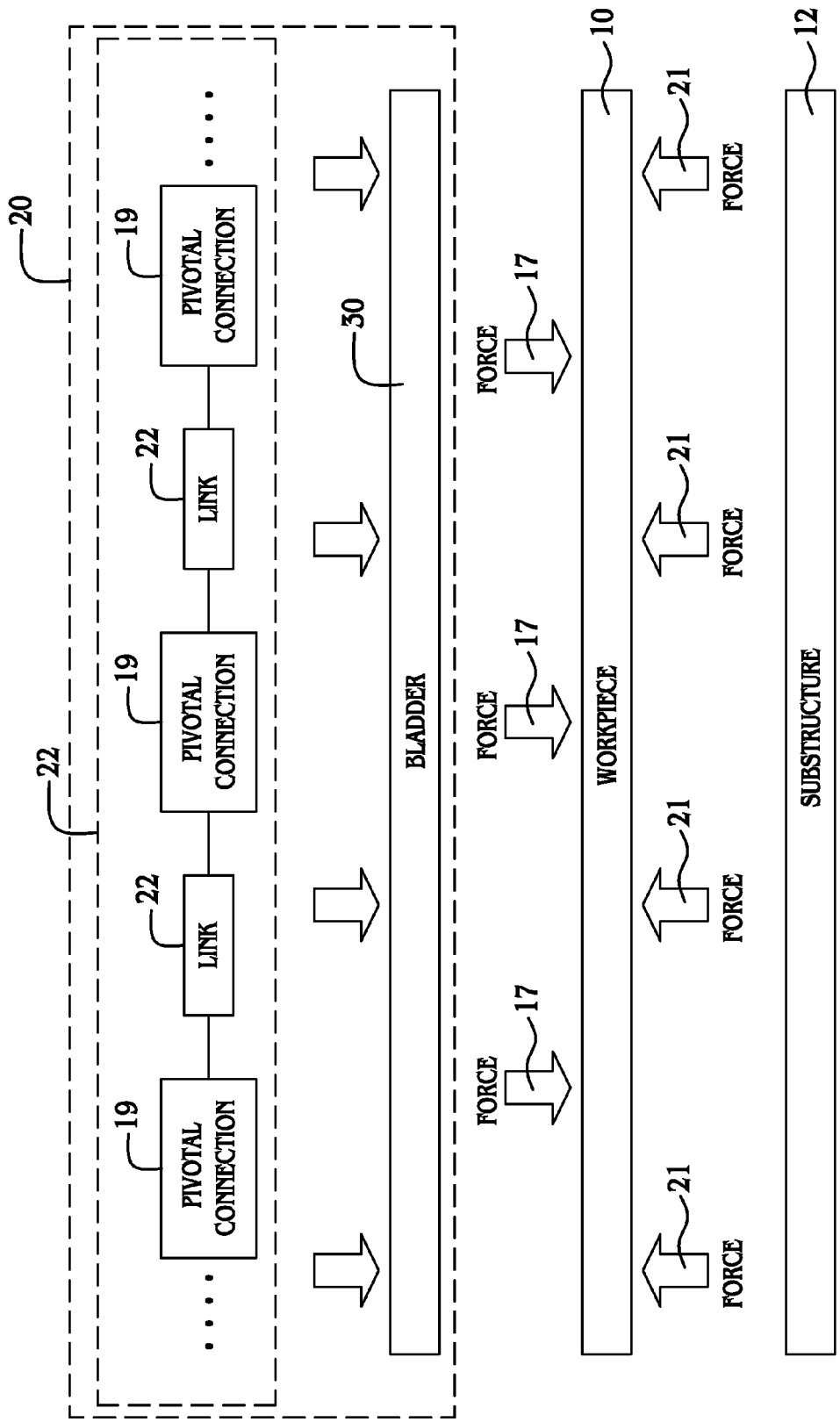
FIG. 1A is a functional block diagram illustrating a clamping system for clamping the workpiece on the substructure.
Figure 2:
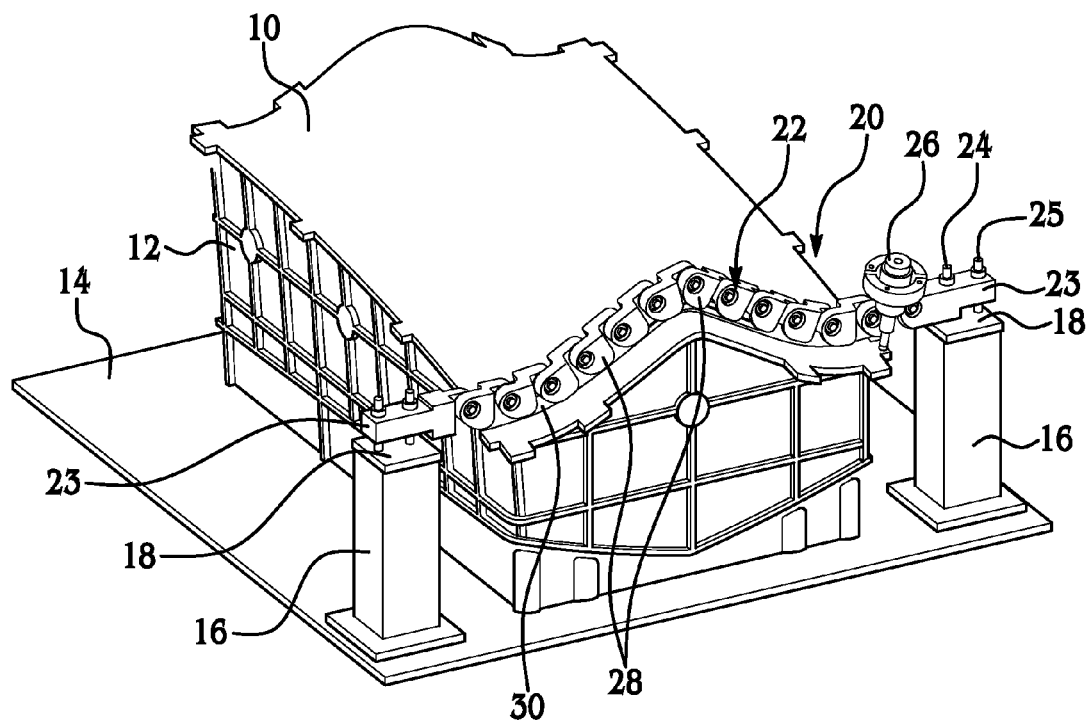
FIG. 2 is a view similar to FIG. 1 but showing the workpiece clamped on the support structure using the clamping system according to an embodiment of the disclosure.
Figure 3:
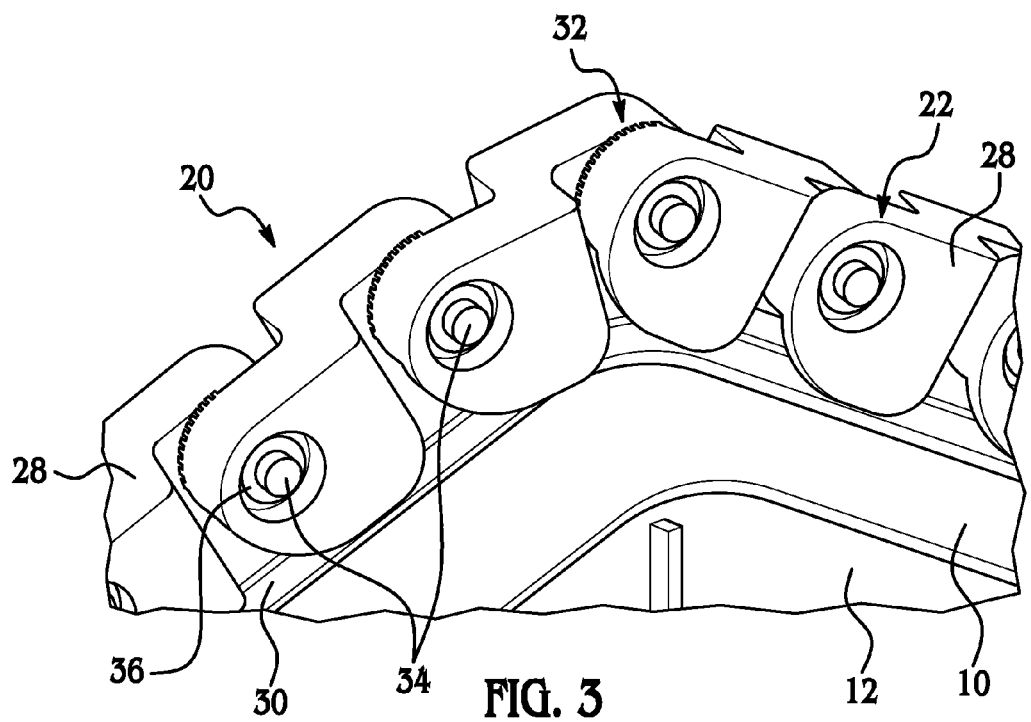
FIG. 3 is an enlarged, perspective illustration of the reconfigurable clamping system shown in FIG. 2.

In the illustrated example, the workpiece 10 has a cross section that is generally bell shaped which changes in contour from the front to the rear, as viewed in FIGS. 1 and 2. For sake of simplicity, only a single clamping system 20 is shown in FIG. 2, however in practice it should be understood that a plurality of the clamping systems 20 may be employed to clamp the workpiece 10 to the substructure 12 along its length. In the embodiment illustrated in FIGS. 1 and 2, four clamping systems 20 may be used which bridge the width of the workpiece 10 and are respectively supported on the mounting post assemblies 16.

The clamping system 20 may be employed to hold down a workpiece 10 during any of a variety of manufacturing operations such as machining, routing, cutting or welding. In the illustrated example, a tool 26 in the form of a friction stir welding (FSW) head is used to weld the skin 10 to the substructure 12. As will be discussed later in more detail, the clamping system 20 may be readily reconfigured to clamp workpieces 10 having part features, configurations or surface contours other than those illustrated in the drawings. Moreover, a plurality of identical clamping systems 20 may be employed to hold down various areas of a particular workpiece 10 even though the surface contour of the workpiece 10 may vary over its surface.

The retention assembly 22 is pivotally connected to the mounting blocks 23. The inflatable bladder 30 functions as a hold-down intensifier that holds and pushes the workpiece against the substructure 14. When locked in a rigid, clamping position as described later herein, the retention assembly 22 generally conforms to the shape of the workpiece 10 and functions to retain the inflatable bladder 30 while the inflatable bladder 30 is inflated to apply clamping force to the workpiece 10. The ends of the retention assembly 22 are secured to the mounting plates 18 by the mounting blocks 23 and hold down fasteners 24.

The retention assembly 22 includes a chain of Z-shaped, pivotally connected links 28 arranged on overlapping, nested relationship. Each end of each of the links 28 includes a through-hole 48 (see FIGS. 5-7) for receiving a fastener which may comprise a bolt 34 having a threaded end for receiving a nut 36. The bolt 34 forms a pivotal connection between adjacent ones of the links 28. Washers 38 may be provided to better distribute clamping forces to the links 28. One end of each of the links 28 may include a counterbore recess 42 in order to recess the nut 36. A spring 40, which may be a Bellville washer or a spring washer for example, is sleeved over the bolt 34 and positioned between opposing faces 29 (FIGS. 5 and 6) in order to normally bias the faces 29 away from each other.

The opposing faces 29 of the links 28 each include interlocking elements which may comprise circular spline gears 32 circumferentially arranged around the through-hole 48. The spline gears 32 may be formed in the opposing faces 29 of the links 28 by machining, molding or other common fabrication techniques. The spline gears 32 provide radial features 50 which meshingly engage the corresponding features 50 on an opposing face 29 when the links are clenched together, so as to interlock the links 28 in a desired rotational position, allowing the links 28 to conform to the shape of the workpiece 10.

Figure 4:
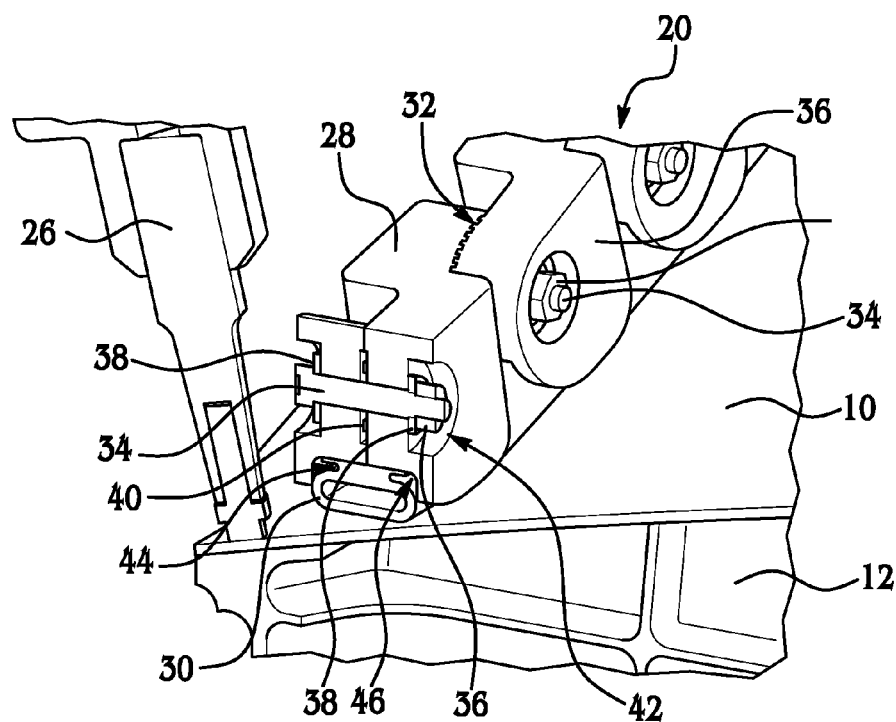
FIG. 4 is a cross sectional illustration of the clamping system, shown in relation to the workpiece and a tool.
Figure 5:
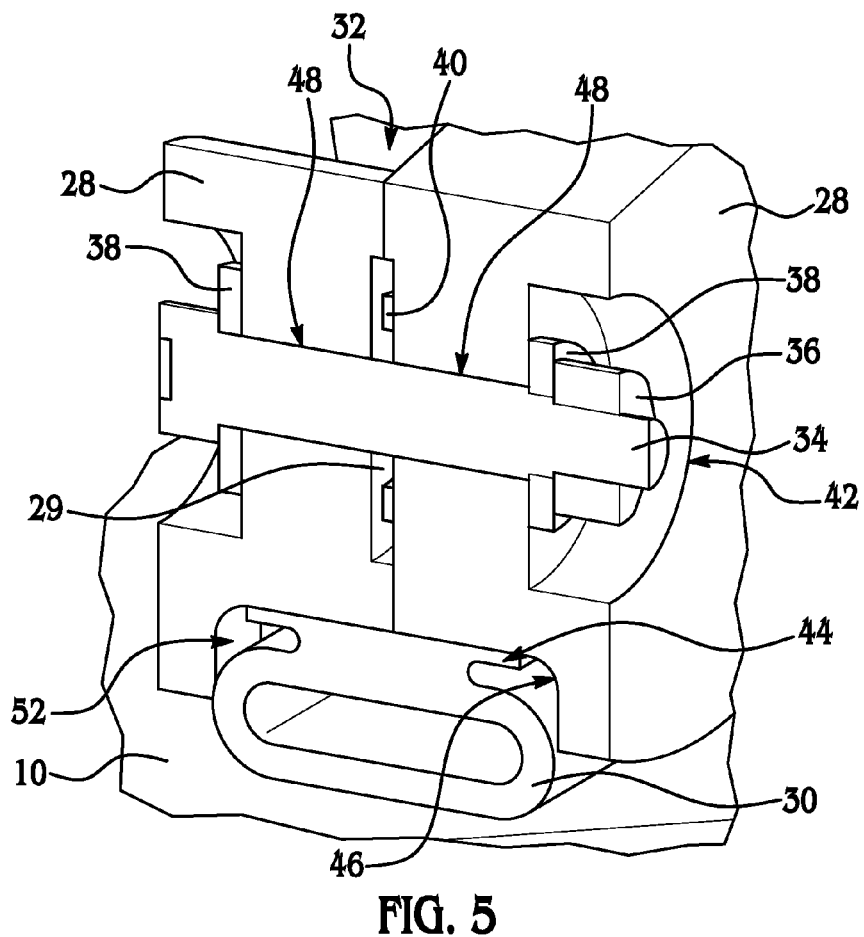
FIG. 5 is a sectional illustration showing details of the clamping system.
Figure 6:
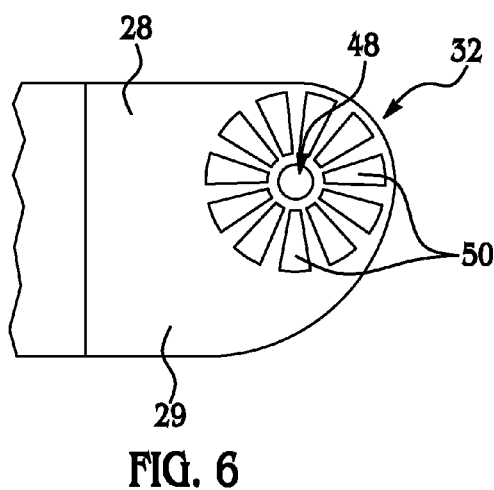
FIG. 6 is a side illustration of a portion of one of the links, better depicting a spline gear.
Figure 7:
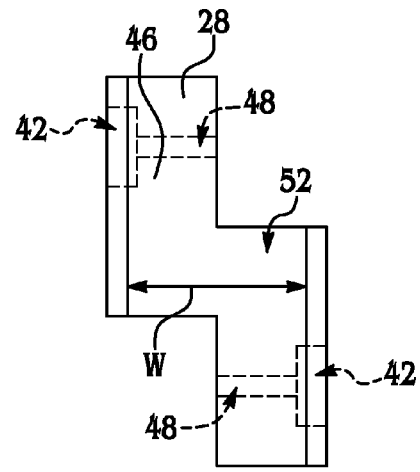
FIG. 7 illustrates the bottom of one of the links, better showing a recess channel for retaining an inflatable bladder.

As best seen in FIGS. 4, 5 and 7, each of the links 28 includes a recess 46 on the bottom side thereof facing the workpiece 10. The recesses 46 in the links 28 collectively form a channel 52 that has a width "W" (FIG. 7) and extends substantially the entire length of the retention assembly 22. The inflatable bladder 30 is retained within the channel 52 and may include a flat rib 44 on the upper side thereof which engages the bottom of the links 28 and thereby better distributes force between the retention assembly 22 and the workpiece 10.

In one particular embodiment, the inflatable bladder may comprise a silicon hose including NOMEX fiber manufactured by Presray Pneuma-seal of Pawling Engineered Products. The inflatable bladder 30 with NOMEX fiber retains approximately 80% of its strength at 400° F., permitting high temperature manufacturing operations to be undertaken on the workpiece 10 in close proximity to the retention assembly 22. By way of example, but not limitation, in friction stir welding applications of approximately ⅛" aluminum skin to an underlying substructure, the inflatable bladder 30 is suitably inflated to about between 10 and 80 psi. The friction stir welding tool 26 may then engage the workpiece 10 in the area immediately around the retention assembly 22 while the inflatable bladder 30 maintains clamping pressure on the workpiece 10, despite the heat generated by the welding tool 26.

Figure 8:
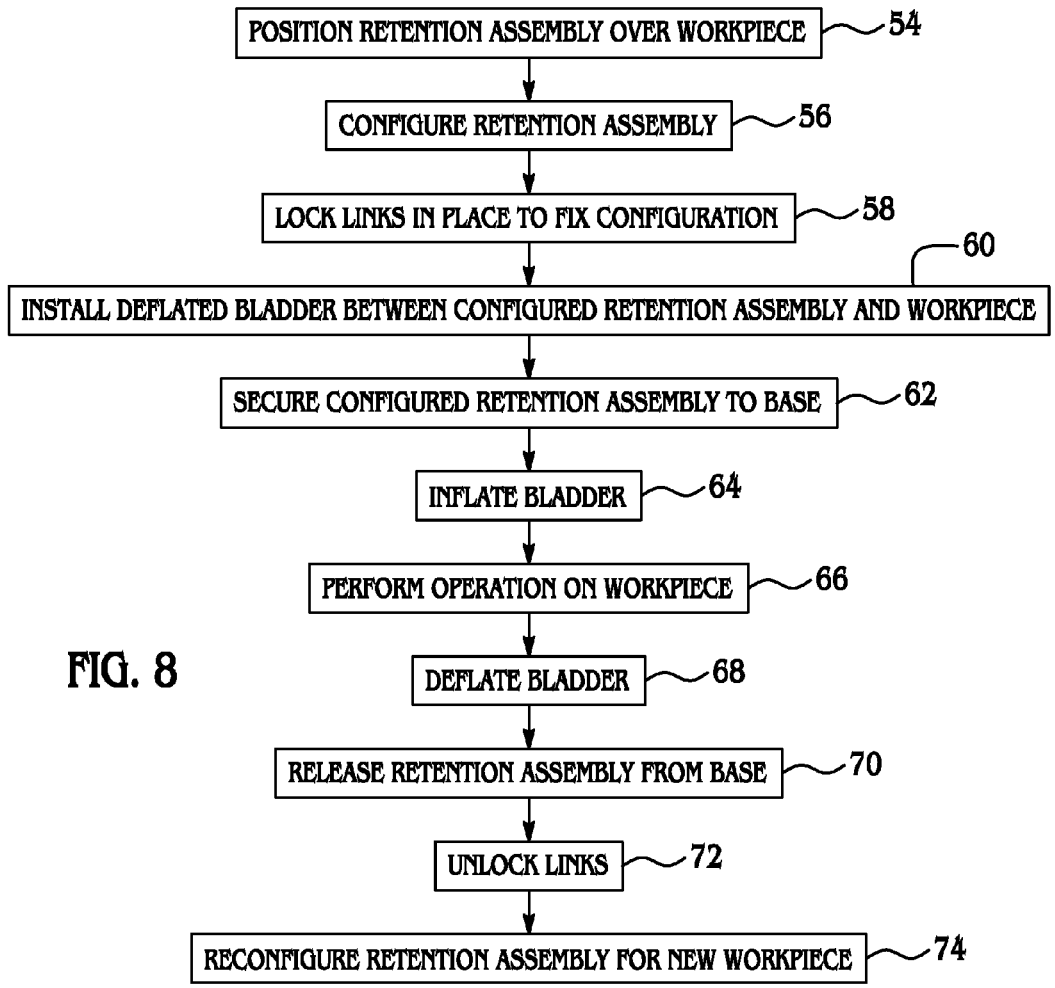
FIG. 8 is a block diagram illustration of a method for clamping a workpiece according to a method embodiment of the disclosure.

Referring now to FIG. 8, a method of clamping a workpiece begins at step 54 in which the retention assembly 22 is bridged over the workpiece 10 so that the ends of the retention assembly 22 lie generally over the mounting plates 18. At this stage, the links 28 freely pivot relative to each other as a result of the outward biasing force imposed by the springs 40 which force the spline gears 32 apart so that they are unlocked. Therefore, the retention assembly 22 is freely flexible and thus may conform to the surface configuration and contours of the workpiece 10. The retention assembly 22 is configured at step 56 by manually manipulating the links 28 to conform to the surface contours of the workpiece 20.

Next, at step 58, the links 28 are locked in place by tightening the nuts 36. Tightening of the nuts 36 draws adjacent links 28 together, bringing the opposing spline gears 32 into interlocking engagement which locks the links against pivotal movement. Tightening of the nut 36 effectively clenches the spline gears 32 together, against the biasing influence of the spring 40. After tightening each of the nuts 36 for all of the links 28, the retention assembly 22 becomes a rigid assembly having a shape generally matching that of the contour or configuration of the workpiece 10 in the area where the clamping assembly 20 has been installed.

With the retention assembly 22 having been configured, the inflatable bladder 30 is then installed within the channel 52, between the retention assembly 22 and the workpiece 10, as shown at step 60. Next, at step 62, the retention assembly 22 is secured to the mounting post assemblies 16 by fastening the mounting blocks 23 to the plates 18 using the hold down fasteners 24. The inflatable bladder 30 is then inflated at step 64, resulting in a clamping force being applied to the workpiece 10 as the retention assembly 22 holds and retains the inflatable bladder 30. The retainer assembly 22 resists the load imposed by the inflatable bladder 30, causing the inflatable bladder 30 to hold the workpiece 10 to the substructure 12. The inflatable bladder 30 also makes up the gap between the retention assembly 22 and the workpiece 10 so that the retention assembly 22 tightly conforms to the contour of the workpiece 10.

With the workpiece 10 securely clamped, any of various operations such as friction stir welding may be performed on the workpiece 10, as shown in step 66. When the operations on the workpiece 10 are complete, the inflatable bladder 30 is deflated at step 68 following which the retention assembly 22 is released from the base 14, as shown in step 70, by unfastening the mounting blocks 23 from the mounting plates 18. Next, at step 72, the links 28 are unlocked so that the retention assembly 22 may be later configured to hold a different workpiece 10. This unlocking process comprises loosening (unscrewing) the nuts 36 until the springs 40 to force the opposing faces 29 apart, thereby unlocking the spline gears 32. At this point, the retention assembly 22 is again freely flexible, allowing it to be reconfigured to match the contour of a new workpiece, as shown at step 74.

Figure 9:
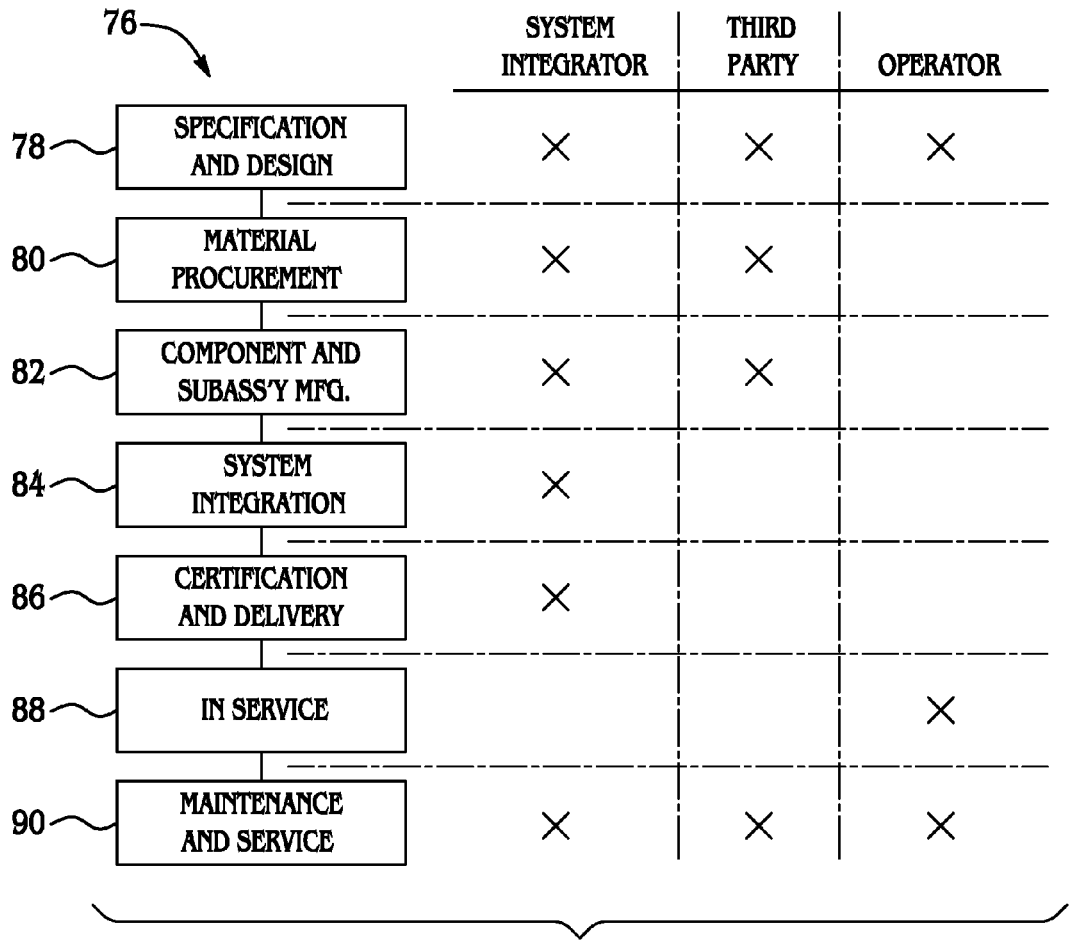
FIG. 9 is a flow diagram of an aircraft production and service method.
Figure 10:
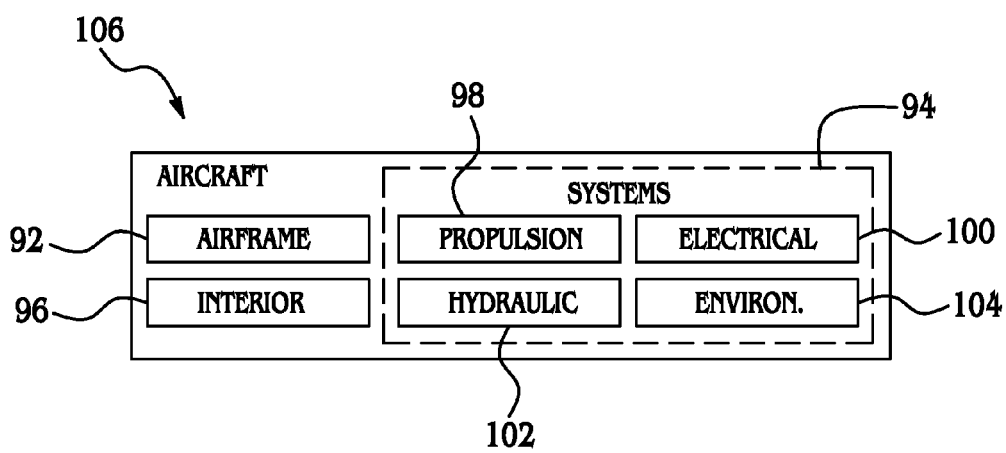
FIG. 10 is a block diagram of an aircraft.

The embodiments of the disclosure described above may be used in an aircraft manufacturing and service method 76 as shown in FIG. 9 and an aircraft 106 as shown in FIG. 10. During pre-production, exemplary method 100 may include specification and design 78 of the aircraft 106 and material procurement 80 During production, component and subassembly manufacturing 82 and system integration 84 of the aircraft 106 takes place. Thereafter, the aircraft 106 may go through certification and delivery 86 in order to be placed in service 88. While in service by a customer, the aircraft 106 is scheduled for routine maintenance and service 90 (which may include modification, reconfiguration, refurbishment, and so on).

Each of the processes of method 76 may be performed or carried out by a system integrator, a third party, and/or an operator (e.g., a customer), as indicated by the "X" in the grid to the right of the flow diagram of FIG. 9. For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 106 produced by exemplary method 76 may include an airframe 92 with a plurality of systems 94 and an interior 96. Examples of high-level systems 94 include one or more of a propulsion system 98, an electrical system 100, a hydraulic system 102, and an environmental system 104.

Apparatus and methods embodied herein may be employed during any one or more of the stages of the production and service method 76. For example, components or subassemblies corresponding to production process 82 may be fabricated or manufactured in a manner similar to components or subassemblies produced while the aircraft 106 is in service. Also, one or more apparatus embodiments, method embodiments, or a combination thereof may be utilized during the production stages 82 and 84, for example, by substantially expediting assembly of or reducing the cost of an aircraft 106. Similarly, one or more of apparatus embodiments, method embodiments, or a combination thereof may be utilized while the aircraft 106 is in service, for example and without limitation, to maintenance and service 90.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A clamping system for securing a workpiece, comprising:
   a retention assembly comprising a plurality of links, each pair of adjacent links having a pivotal connection to enable the retention assembly to be configured to the general shape of a workpiece, and each pair of adjacent links having a locking mechanism to selectively lock an angular relationship between the pair, wherein the adjacent pairs of links define a retention channel in a longitudinal direction, and wherein each of the links is Z-shaped, and the links are arranged in overlapping, nested relationship; and
   an inflatable bladder to be positioned in the retention channel and coupled between the retention assembly and the workpiece and to apply a clamping force to the workpiece.

2. The clamping system of claim 1, wherein the links comprise overlapping, opposing faces, and
   the locking mechanism comprises interlocking spline gears on the opposing faces of the links in each of the adjacent pairs, wherein the spline gears are positioned at joints of the adjacent pairs.

3. The clamping system of claim 2, wherein the locking mechanism further comprises a clamp to clench the spline gears together.

4. The clamping system of claim 2, wherein the locking mechanism further comprises a threaded fastener to draw the opposing faces together.

5. The clamping system of claim 2, wherein the locking mechanism further comprises a spring to bias the opposing faces of the adjacent links away from each other.

6. The clamping system of claim 1, wherein the channel is defined by recessed areas in the links.

7. A reconfigurable clamping system for securing a workpiece, comprising:
   a reconfigurable retention assembly to generally match the shape of a workpiece, the retention assembly comprising a plurality of links, wherein adjacent pairs of links define a retention channel in a longitudinal direction, and wherein each of the links is Z-shaped, and the links are arranged in overlapping, nested relationship;
   a plurality of locking devices to lock adjacent pairs of the links in respective angular relationships to generally match the shape of a workpiece, wherein the locking devices are located at joints between the adjacent pairs; and an inflatable bladder to be positioned in the retention channel and to apply a clamping force to the workpiece.

8. The clamping system of claim 7, wherein the retention assembly comprises a chain including the plurality of links, adjacent pairs of the links being pivotally connected.

9. The clamping system of claim 8, wherein the locking devices each include a plurality of locking elements for locking the links against pivotal movement relative to each other.

10. The clamping system of claim 8, wherein:
adjacent pairs of the links overlap and include opposing faces, and
the locking devices each include interlocking elements respectively in the opposing faces for locking the adjacent pairs of the links against relative pivotal movement.

11. The clamping system of claim 7, wherein:
each of the links includes a bottom face, and
the bladder includes a generally flat wall bearing against the bottom face of each of the links.

12. A clamping system for securing a workpiece, comprising:
a retention assembly comprising a plurality of links, each pair of adjacent links having a pivotal connection to enable the retention assembly to be configured to the general shape of a workpiece, and each pair of adjacent links having a spring-loaded locking mechanism to selectively lock an angular relationship between the pair, wherein each of the links is Z-shaped, and the links are arranged in overlapping, nested relationship, wherein the locking mechanism comprises interlocking spline gears on the opposing faces of the links in each of the adjacent pairs, and wherein the spline gears are located at joints of the adjacent pairs of the adjacent links; and
an inflatable bladder to be coupled between the retention assembly and the workpiece and to apply a clamping force to the workpiece.

13. The clamping system of claim 12, wherein the adjacent links define a retention channel to position the inflatable bladder.

\* \* \* \* \*